July 25, 1933.  H. A. CURRIE  1,920,004
CASTER
Filed May 2, 1930
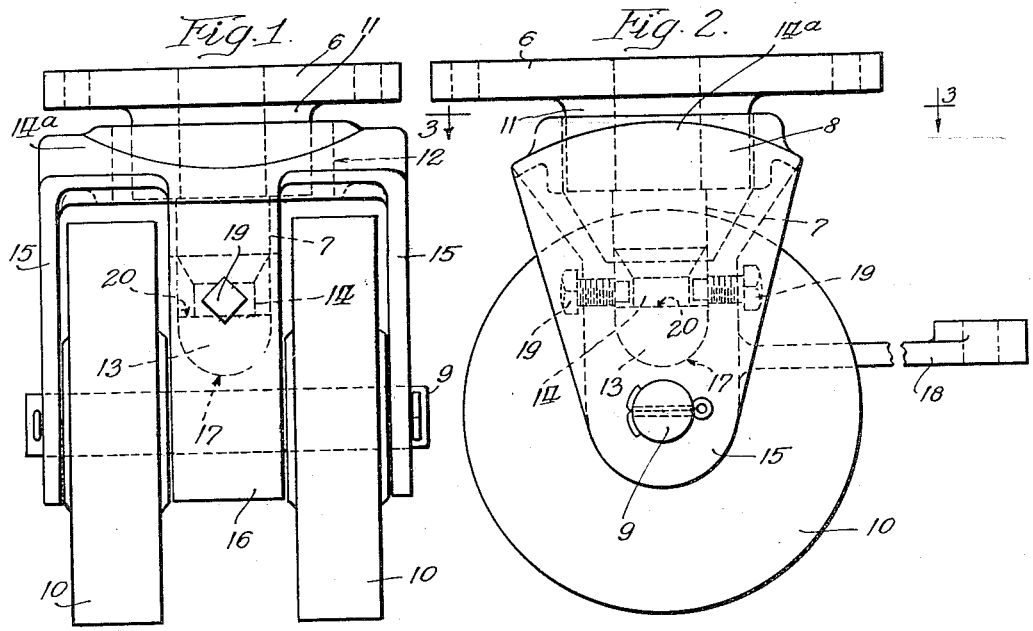
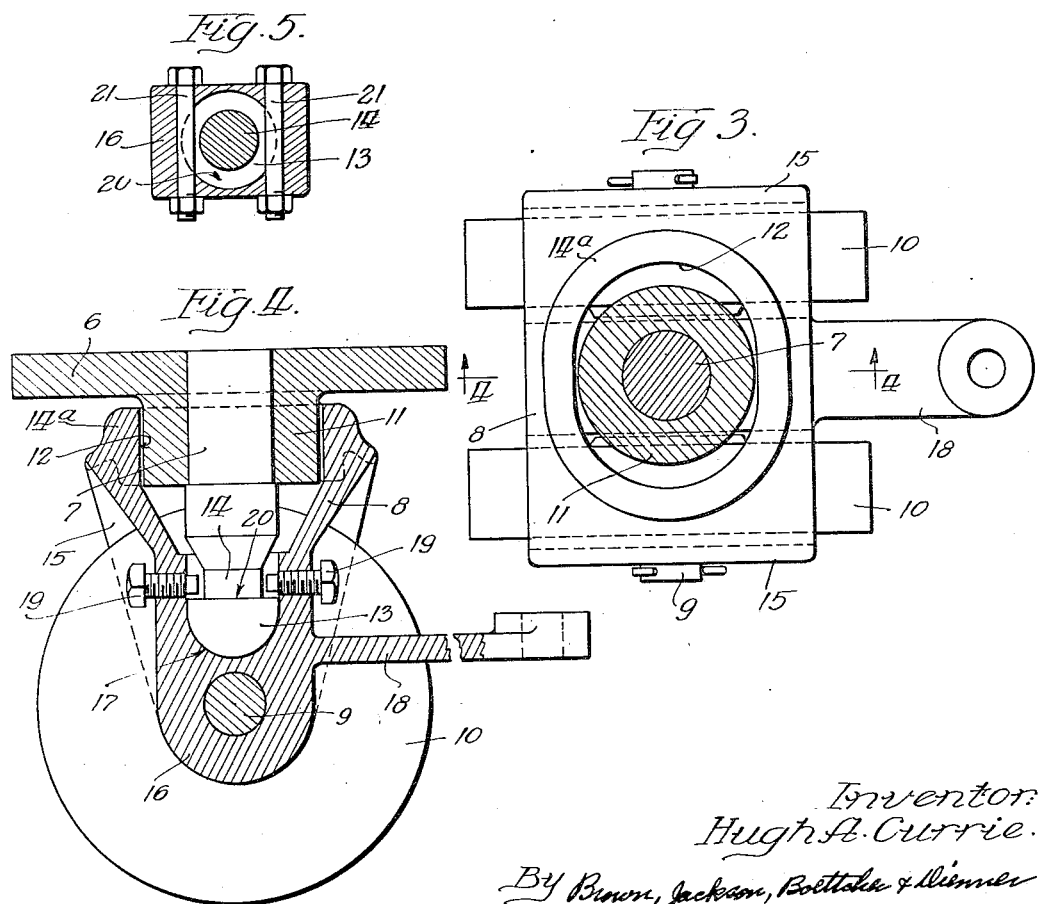
Inventor:
Hugh A. Currie.
By Brown, Jackson, Boettcher & Dienner.
Attys.

Patented July 25, 1933

1,920,004

UNITED STATES PATENT OFFICE

HUGH A. CURRIE, OF CHICAGO, ILLINOIS

CASTER

Application filed May 2, 1930. Serial No. 449,158.

My invention relates to casters, and is concerned more particularly with casters for heavy duty service, such as, for example, for facilitating the movement of steel containers such as are now utilized by the railroads for the transportation of freight and which are moved to and from the specially designed flat-cars that carry a number of such containers. This caster is also adapted to various other uses, such as for facilitating the movement of portable warehouse trucks and the like.

One of the objects of my invention is to provide a caster of great strength and durability and which possesses desirable flexibility in its operation.

Another object of my invention is to produce a caster of the double wheel type and in which the load supported by such caster will be equally distributed between both of the wheels when operating over relatively rough surfaces, under normal conditions. This I accomplish by providing the caster with a yoke of such a construction as will allow the axle of the wheels to swing angularly in a vertical plane and thereby enable the caster wheels to assume different positions relative to a horizontal plane, such a situation occurring when one of the wheels engages an obstruction or depression in the surface over which the wheels are traveling. In present casters of the two wheel type the caster wheels swivel about a vertical axis only, with the result that the entire load is transferred from one wheel to the other when the casters travel over uneven surfaces.

A further object of my invention is to provide the caster with a supporting plate or base that is adapted to serve a double purpose. The supporting plate is adapted to be used as the usual mounting means for the caster assembly and is also provided with a bearing boss which is adapted to guide and limit the movements of the yoke member of the caster, as will be hereinafter fully described.

Other objects and advantages will appear from the following detailed description, reference being had to the accompanying drawing.

In the drawing:

Figure 1 is a front elevational view of the caster;

Figure 2 is a side elevational view of the caster;

Figure 3 is a plan section taken along the line 3—3 of Figure 2 illustrating the relation of the depending bearing boss of the supporting plate to the yoke member of the caster;

Figure 4 is a vertical section through the caster taken along the line 4—4 of Figure 3; and Figure 5 is a horizontal section through the central arm of the yoke member illustrating modified means for retaining the yoke member and its associated parts in operative relation with the supporting plate and with the king pin or post carried thereby.

In the particular embodiment of my invention illustrated in the drawing, the structure comprises a mounting or supporting plate 6, a vertical king pin or post 7 carried thereby, a wheel carrying frame or yoke 8, an axle 9, and a pair of wheels or rollers 10 which are mounted upon the axle. The supporting plate 6 is provided with a depending bearing boss 11 of cylindrical shape which extends into an opening 12 of approximately elliptical shape formed in the upper portion of the wheel carrying frame or yoke 8 and provides a bearing surface for controlling the swiveling and lateral movement of the yoke member. The king pin or post 7 is provided with a hemispherical head 13 at the lower end of a reduced shank portion 14, and the post is securely fastened in the supporting plate 6 in any well known manner, preferably by shrinking the supporting plate onto the post. The supporting plate and the post constitute the stationary members of the caster.

The wheel carrying frame or yoke 8 comprises a head portion 14ª having the opening 12 therein, and provided with depending axle carrying arms 15 and 16, which arms are provided at their lower ends with aligned openings in which the opposite ends and center portion of the axle 9 are mounted. The central arm 16 of the yoke member is of greater cross-sectional area than either of the arms 15, since it is this particular arm which must sustain and carry the greater portion of the load which is transmitted to the post 7, the latter having its hemispherical head 13 bearing and operating within socket 17 provided in arm 16. As is clearly shown in Figure 4, the lower surface of boss 11 is spaced above socket 17 and is out of contact with the wheel frame. This is advantageous as avoiding objectionable friction while also eliminating possibility of binding between the lower surface of the boss and the wheel frame. The king pin or post 7 is located centrally of the caster and directly above the axle and the caster is steered by means of a tongue 18 which is formed integrally with the arm 16.

The carrying frame or yoke 8 is held in operative relation to the stationary elements of the caster in any preferred manner as by means of the dog-pointed screws 19 carried by the arm 16 and projecting into the socket 17 above head 13. In the event that the supporting plate and its associated parts should be raised or lifted, the carrying frame and its several parts will be retained in their normal operative relation to the supporting plate and post by reason of the contact of the screws 19 with the shoulder 20 of the hemispherical head 13.

It is obvious that there are various ways in which the wheel carrying frame may be retained in its coacting relation with the supporting plate and post, and another embodiment of such a means has been illustrated in Figure 5. Bolts 21 extend transversely of the arm 16 and are disposed parallel to the axis of the axle 9. These bolts pass directly over the shoulder 20 of the hemispherical head 13, and are slightly spaced from said shoulder in order to eliminate the possibility of the shoulder striking the bolts when the wheel carrying frame is thrown out of its normal position due to one of the wheels 10 passing over an obstruction.

In casters which are adapted for heavy duty service, a supporting plate of the particular construction embodied in my invention is of paramount importance. Referring to Figures 3 and 4 it is apparent that the depending bearing boss 11 is the guiding and limiting element which controls the various movements of the frame carrying member, such movements being resolved into purely swiveling movement of the caster, purely lateral movement of the swinging carrying frame by reason of the elongated opening 12 therein, or any other combined movements arising out of the lateral swinging of the carrying frame and the swiveling action of the caster. In all such movements the side thrust of the head of the carrying frame is directly imparted to the bearing boss 11 no matter what position the carrying frame may assume. In this manner it is seen that the bearing boss 11 acts not only in the capacity of a guiding and limiting means, but also acts as a shielding means for protecting the king pin or post 7 from the laterally imparted forces which would set up excessive shearing stresses in the post member if the bearing boss of the supporting plate were not interposed between the carrying frame and the post. The boss 11 corresponds in diameter to the shorter axis of opening 12, as is clearly shown in Figure 3. The boss and the surrounding wall of the opening cooperate to hold the wheel frame against objectionable rocking movement on the axis of the wheel, while permitting limited rocking movement of the frame parallel to this axis, the boss serving to guard effectively the post 7 against shearing stresses incident to rocking movement of the wheel frame. With the king pin or post protected as described, the post is chiefly subjected to the compressive stresses which are imparted thereto by the load supported by the caster, while the king pin is relieved of the greater portion of the bending and shearing stresses to which it would otherwise be subjected if the frame head were made to directly engage the pin.

It is seen that the above description relates to a preferred embodiment of my invention, and that it is possible to vary the construction thereof without departing from the field and scope of the invention, and therefore, I do not wish to be strictly limited to the particular caster construction disclosed in the drawing, except insofar as the appended claims are so limited.

What I claim is:

1. In combination in a caster structure, a supporting plate provided with an integral depending cylindrical boss, a post secured in and extending downwardly from the boss, a wheel frame and wheels mounted coaxially thereon, and a universal bearing connection between the lower end of the post and the frame between said wheels, the axis of the post being radial of the axis of the wheels, said frame being provided with an elliptical opening disposed with its longer axis parallel to the wheel axis and the boss extending about the post and into said opening and cooperating with the surrounding wall thereof to limit rocking movement of the wheel frame, the boss guarding the post against shearing stresses incident to rocking of the frame.

2. In combination in a caster structure, a supporting plate provided with a depending cylindrical boss rigid with the plate, a post secured to and extending downwardly from the boss concentrically therewith, a wheel frame comprising a central arm and two end arms, wheels mounted coaxially in the frame between the central arm and the end arms thereof, a universal bearing connection between the lower end of the post and said central arm, the post being radial to the wheel axis, said frame being provided with an elliptical opening and the boss extending about the post and into said opening, and a steering arm extending from said central arm of the frame.

3. In combination in a caster structure, a supporting plate provided with an integral depending boss, a post secured in and extending downwardly from the boss, a wheel mounted frame, and a universal bearing connection between the lower end of the post and the frame, said frame being provided with an elliptical opening disposed with its longer axis parallel to the wheel axis of the frame, the boss extending into said opening and cooperating with the surrounding wall thereof to limit rocking movement of the wheel frame, said boss guarding the post against shearing stresses incident to rocking of the frame and having its lower surface out of contact with the wheel frame.

HUGH A. CURRIE.